United States Patent
Beacock et al.

(10) Patent No.: US 6,431,820 B1
(45) Date of Patent: Aug. 13, 2002

(54) METHODS AND APPARATUS FOR COOLING GAS TURBINE ENGINE BLADE TIPS

(75) Inventors: Robert John Beacock, Cincinnati; Omer Duane Erdmann, Maineville; Robert Edward Athans, Cincinnati; Harold Paul Rieck, Jr., Middletown, all of OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/796,967

(22) Filed: Feb. 28, 2001

(51) Int. Cl.[7] .................................................. F01D 9/06
(52) U.S. Cl. ........................... 415/1; 415/115; 415/191; 415/208.2
(58) Field of Search ................................. 415/115, 191, 415/208.2, 144, 1

(56) References Cited

U.S. PATENT DOCUMENTS

| | | | |
|---|---|---|---|
| 3,628,880 A | * 12/1971 | Smuland et al. | 415/115 |
| 4,693,667 A | * 9/1987 | Lenz et al. | 415/115 |
| 4,820,116 A | * 4/1989 | Hovan et al. | 415/115 |
| 4,946,346 A | * 8/1990 | Ito | 415/115 |
| 5,577,884 A | * 11/1996 | Mari | 415/115 |
| 5,593,276 A | 1/1997 | Proctor et al. | |
| 5,593,277 A | 1/1997 | Proctor et al. | |
| 5,993,150 A | 11/1999 | Liotta et al. | |
| 6,142,730 A | * 11/2000 | Tomita et al. | 415/115 |
| 6,241,471 B1 | 6/2001 | Herron | |
| 6,254,345 B1 | 7/2001 | Harris et al. | |

OTHER PUBLICATIONS

Patent Application, "Impingement Cooled Airfoil," 13DV13601, Ser. No. 09/568,441, filed May 10, 2000 in the US Patent & Trademark Office.

* cited by examiner

Primary Examiner—Edward K. Look
Assistant Examiner—Ninh Nguyen
(74) Attorney, Agent, or Firm—Rodney M. Young; Armstrong Teasdale LLP

(57) ABSTRACT

A turbine for a gas turbine engine including a turbine nozzle assembly that facilitates reducing an operating temperature of rotor blades in a cost-effective and reliable manner is described. Each rotor blade includes a tip that rotates in close proximity to a shroud that extends circumferentially around the rotor assembly. The turbine nozzle assembly includes a plurality of turbine vane segments that channel combustion gases to downstream rotor blades. Each turbine vane segment extends radially outward from an inner platform and includes a tip, a root, and a body that extends therebetween. The turbine vane segment tip is formed integrally with an outer band that mounts the vane segments within the gas turbine engine. The outer band is in flow communication with a cooling fluid source, and includes at least one opening.

18 Claims, 3 Drawing Sheets

METHODS AND APPARATUS FOR COOLING GAS TURBINE ENGINE BLADE TIPS

BACKGROUND OF THE INVENTION

This invention relates generally to turbine assemblies, and more particularly, to methods and apparatus for cooling gas turbine engine rotor blade tips.

Gas turbine engines typically include a compressor, a combustor, and at least one turbine. The compressor compresses air which is mixed with fuel and channeled to the combustor. The mixture is then ignited for generating hot combustion gases, and the combustion gases are channeled to the turbine which extracts energy from the combustion gases for powering the compressor, as well as producing useful work to propel an aircraft in flight or to power a load, such as an electrical generator.

The turbine includes a rotor assembly and a stator assembly. The rotor assembly includes a plurality of rotor blades extending radially outward from a disk. More specifically, each rotor blade extends radially between a platform adjacent the disk, to a tip. A combustion gas flowpath through the rotor assembly is bound radially inward by the rotor blade platforms, and radially outward by a plurality of shrouds.

The stator assembly includes a plurality of stator vanes which form a nozzle that directs the combustion gases entering the turbine to the rotor blades. The stator vanes extend radially between a root platform and a tip. The tip includes an outer band that mounts the stator assembly within the engine.

During operation, the turbine stator and rotor assemblies are exposed to hot combustion gases. Over time, continued exposure to hot combustion gases increases an operating temperature of the rotor assembly. As the rotor assembly rotates, higher temperatures migrate from each rotor blade root towards each rotor blade tip. The increased operating temperature of the rotor blade tips may cause the shroud surrounding the rotor assembly to weaken and oxidize.

To facilitate reducing operating temperatures of the rotor blade tips, at least some known rotor assemblies include blade cooling systems which channel cooling air from a compressor through a pre-swirl system. The pre-swirl system discharges the air into radial passages in the rotor blades. The cooling air flows through the rotor blades and is exhausted radially outward through the tip of the blade. Such cooling systems are costly and use significant amounts of cooling air in addressing a local, life-limiting problem.

BRIEF SUMMARY OF THE INVENTION

In an exemplary embodiment, a turbine for a gas turbine engine includes a turbine nozzle assembly that facilitates reducing an operating temperature of rotor blades in a cost-effective and reliable manner. Each rotor blade includes a tip that rotates in close proximity to a shroud extending circumferentially around the rotor assembly. The turbine nozzle assembly includes a plurality of turbine vane segments that channel combustion gases to downstream rotor blades. Each turbine vane segment extends radially outward from an inner platform and includes a tip, a root, and a body extending therebetween. The turbine vane segment tip is formed integrally with an outer band used to mount the vane segments within the gas turbine engine. The outer band is in flow communication with a cooling fluid source, and includes at least one opening.

During operation, as the turbine rotates, cooling fluid is supplied from the cooling source to each turbine vane segment outer band. The cooling fluid is channeled downstream through the outer band opening to the rotating blades. More specifically, the cooling fluid is supplied circumferentially around the rotor blade tips to facilitate reducing an operating temperature of the rotor blade tips and the shrouds surrounding the rotor blades. As a result, the turbine nozzle assembly facilitates reducing an operating temperature of the rotor assembly in a cost-effective and reliable manner.

DETAILED DESCRIPTION OF THE INVENTION

Figure 1:
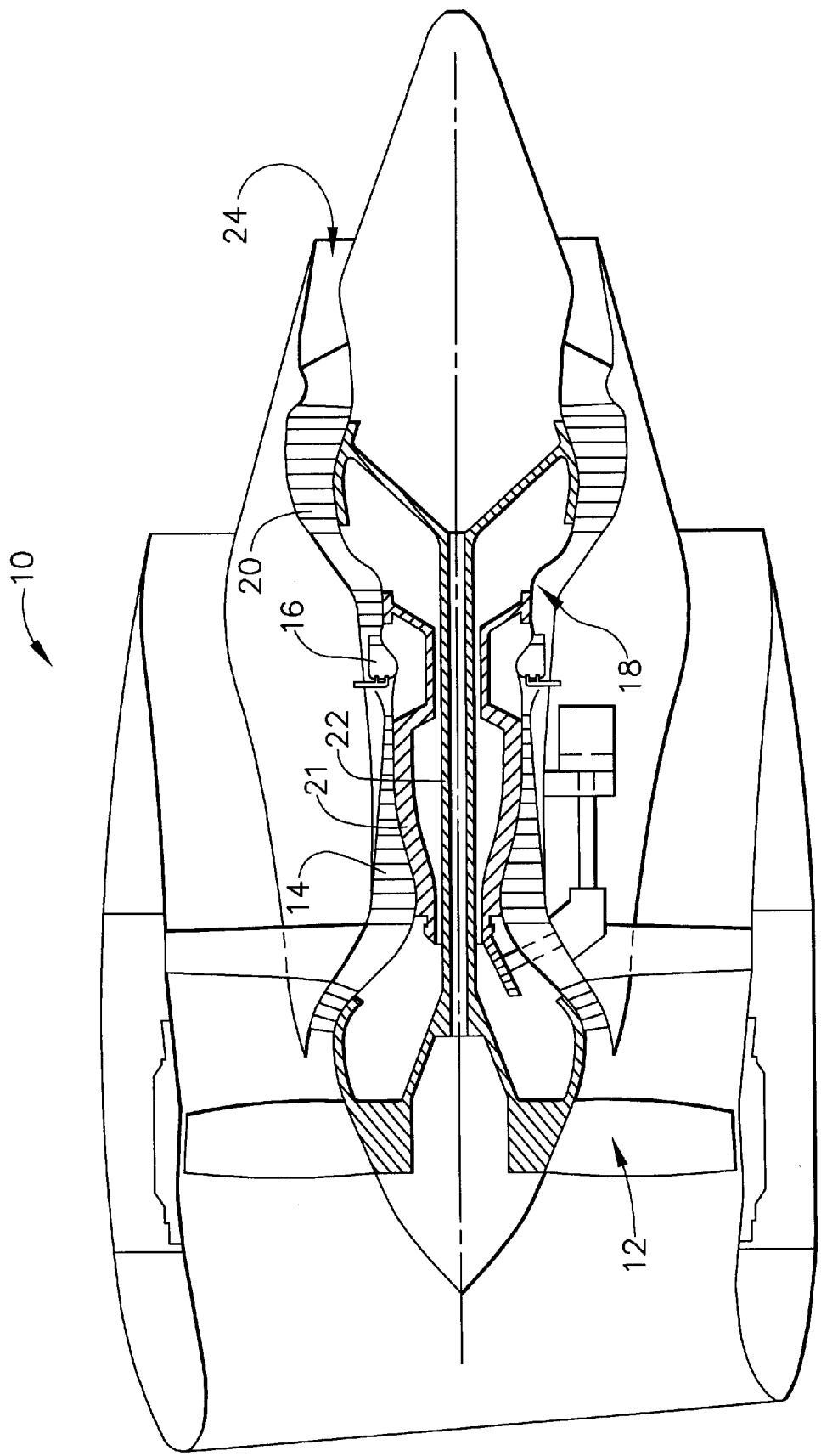
FIG. 1 is schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 22, and compressor 14 and turbine 18 are coupled by a second shaft 21. In one embodiment, gas turbine engine 10 is a GE90 engine commercially available from General Electric Aircraft Engines, Cincinnati, Ohio.

In operation, air flows through low pressure compressor 12 and compressed air is supplied from low pressure compressor 12 to high pressure compressor 14. The highly compressed air is delivered to combustor 16. Airflow from combustor 16 drives turbines 18 and 20 and exits gas turbine engine 10 through a nozzle 24.

Figure 2:
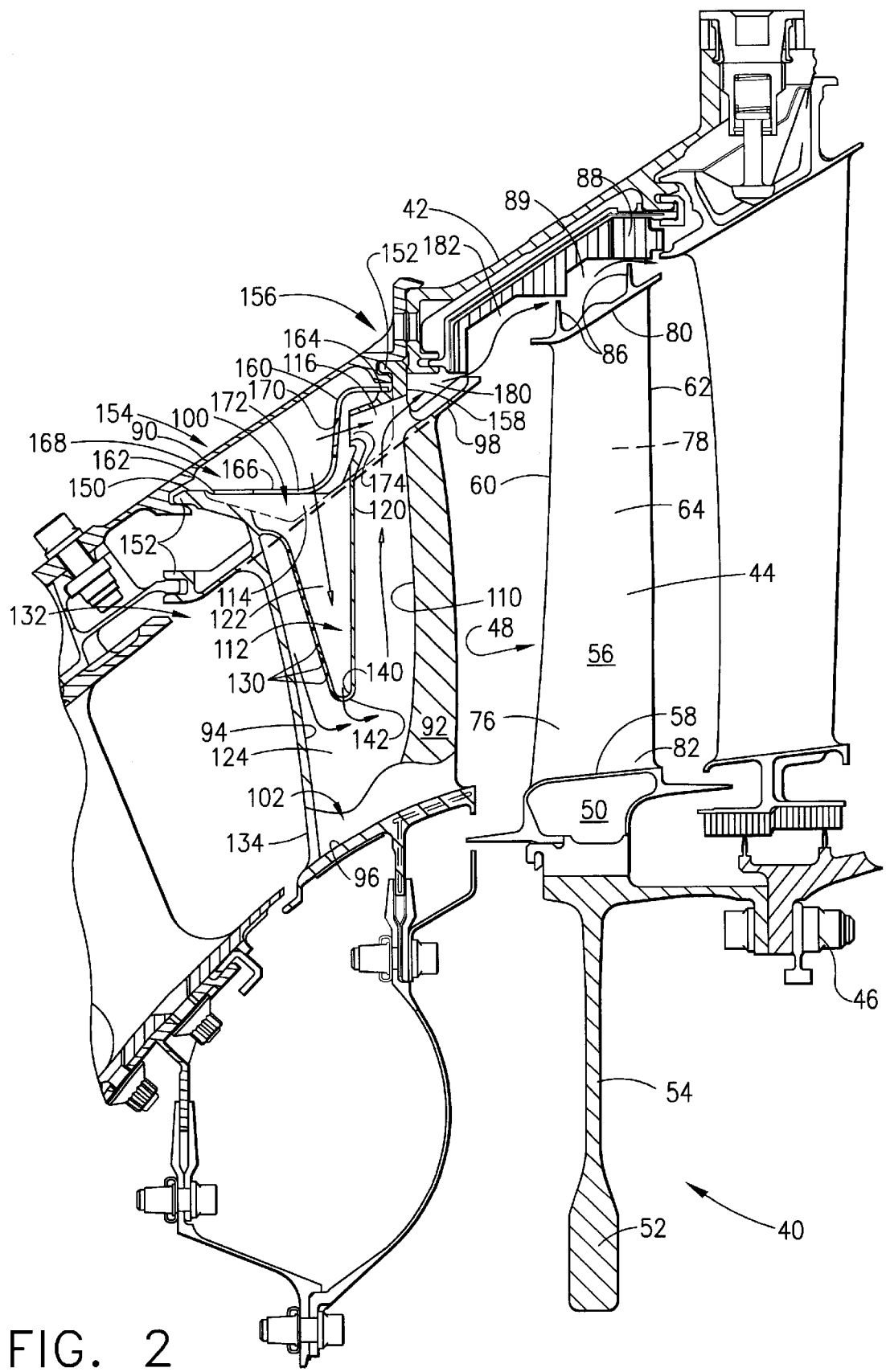
FIG. 2 is a partial cut-away cross-sectional view of a rotor assembly and a stator assembly that may be used with gas turbine engine shown in FIG. 1.
Figure 3:
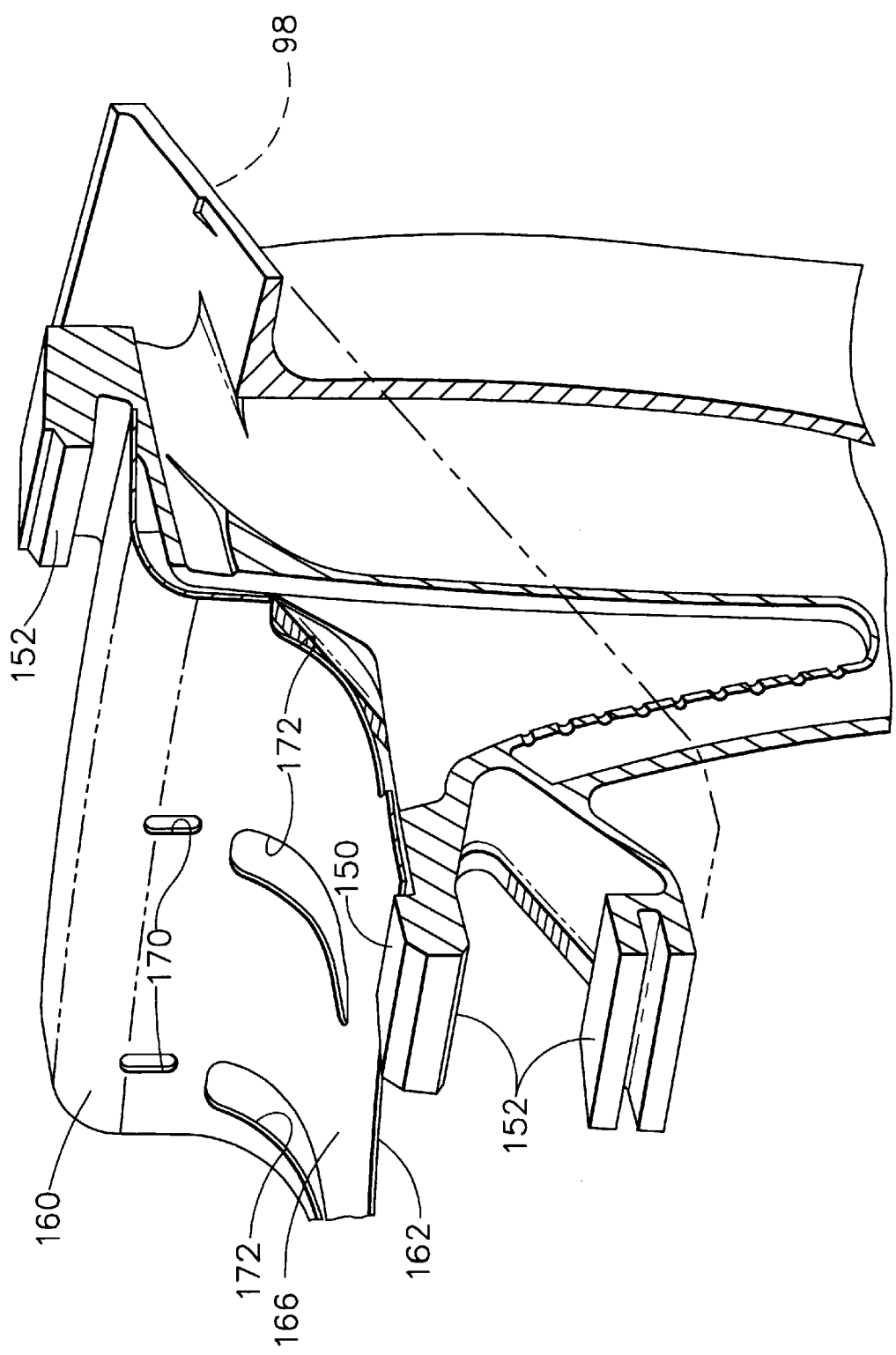
FIG. 3 is a partial perspective forward view of the stator assembly shown in FIG. 2.

FIG. 2 is a partial cut-away cross-sectional view of a rotor assembly 40 including a stator 42 that may be used with gas turbine engine 10. FIG. 3 is a partial perspective forward view of stator 42. Rotor assembly 40 includes a plurality of rotors 44 joined together by couplings 46 co-axially about an axial centerline axis (not shown ). Each rotor 44 is formed by one or more blisks 48, and each blisk 48 includes an annular radially outer rim 50, a radially inner hub 52, and an integral web 54 extending radially therebetween. Each blisk 48 also includes a plurality of blades 56 extending radially outwardly from outer rim 50. Blades 56, in the embodiment illustrated in FIG. 2, are integrally joined with respective rims 50. Alternatively, and for at least one stage, each rotor blade 56 may be removably joined to rims 50 in a known manner using blade dovetails (not shown) which mount in complementary slots (not shown) in a respective rim 50.

Rotor blades 56 are configured for cooperating with a motive or working fluid, such as air. In the exemplary embodiment illustrated in FIG. 2, rotor assembly 40 is a turbine, such as low pressure turbine 20 (shown in FIG. 1), with rotor blades 56 configured for suitably directing the motive fluid air in succeeding stages. Outer surfaces 58 of rotor rims 50 define a radially inner flowpath surface of turbine 20 as air flows from stage to stage.

Blades 56 rotate about the axial centerline axis up to a specific maximum design rotational speed, and generate centrifugal loads in rotating components. Centrifugal forces generated by rotating blades 56 are carried by portions of rims 50 directly below each rotor blade 56. Rotation of rotor assembly 40 and blades 56 extracts energy from the air which causes turbine 20 to rotate and provide power to drive low pressure compressor 12 (shown in FIG. 1). The radially inner flowpath is bound circumferentially by adjacent rotor blades 56 and is bound radially with a shroud 58.

Rotor blades 56 each include a leading edge 60, a trailing edge 62, and an airfoil 64 extending therebetween. Each airfoil 64 includes a suction side 76 and a circumferentially opposite pressure side 78. Suction and pressure sides 76 and 78, respectively, extend between axially spaced apart leading and trailing edges 60 and 62, respectively and extend in radial span between a rotor blade tip shroud 80 and a rotor blade root 82. A blade chord is measured between rotor blade trailing and leading edges 62 and 60, respectively. In the exemplary embodiment, rotor blades 56 include rotor seal teeth 86 which rotate adjacent to stator shroud 88 and through a cavity 89 defined by stator shroud 88 and rotor blade tip shroud 80.

Stator assembly 42 includes a generally cylindrical support 90. A row of low pressure turbine vane segments 92, known as a turbine nozzle, are mounted to support 90 and extend circumferentially within engine 10. Each vane segment 92 includes a plurality of airfoil bodies 94 extending radially between an inner platform 96 which defines a portion of the radially inner flowpath, and an outer platform 98 which bounds the flowpath radially with shrouds 88. More specifically, each airfoil body 94 extends between a vane segment tip 100 and a vane segment root 102.

Each vane segment body 94 is hollow and includes an interior surface 110 that defines a cavity 112. Cavity 112 includes an inlet 114 and an outlet 116 for passing cooling fluid through cavity 112. In one embodiment, the cooling fluid is compressor bleed air. A unshaped partition or wall 120 extends radially into cavity 112 from airfoil tip 100 towards airfoil root 102. In an alternative embodiment, partition 120 is non-u-shaped. Partition 120 divides cavity 92 into a first cooling passage 122 and a second cooling passage 124. First cooling passage 122 is in flow communication with cavity inlet 114 for receiving cooling fluid to first cooling passage 122, and second cooling passage 124 is in flow communication with cavity outlet 116 for exhausting cooling fluid from second passage 124.

A plurality of cooling openings 130 extend through partition 120 between first cooling passage 122 and second cooling passage 124. Cooling openings 130 permit cooling fluid to pass from first cooling passage 122 to second cooling passage 124. More specifically, a size and a position of cooling openings 130 with respect to cavity interior surface 110 are selected to facilitate cooling fluid being directed towards a portion 132 of cavity interior surface 110 immediately adjacent a leading edge 134 of airfoil body 94. Thus, cooling fluid impinges upon cavity interior surface portion 132 to cool airfoil body 94 by impingement cooling.

A metering opening 140 also extends through partition 120 between first cooling passage 122 and second cooling passage 124. Opening 140 is positioned with respect to cavity interior surface 110 such that cooling fluid is discharged from first cooling passage 122 into second cooling passage 124 without impinging interior surface 110. In the exemplary embodiment, opening 140 is positioned near a lower apex 142 of partition 120 such that air is directed radially inward and away from cavity interior surface 110. More specifically, a size and a position of opening 140 are selected to facilitate discharging cooling fluid into second cooling passage 124 for convective cooling of second cooling passage 124. In one embodiment, opening 140 is sized such that approximately one third of cooling fluid entering first cooling passage 122 is discharged into second cooling passage 124 through opening 140, and approximately two thirds of the cooling fluid is discharged through openings 130. In an alternative embodiment, partition 120 includes a plurality of openings 140.

An outer band structure 150 is formed integrally with airfoil body tip 100. Outer band 150 includes a plurality of hook mounts 152 for coupling turbine vane segment 92 circumferentially to support 90. More specifically, outer band 150 includes an upstream side 154 and a downstream side 156. Outer band downstream side 156 includes an opening 158 extending therethrough.

A heat shield 160 is contoured to fit between outer band upstream and downstream sides 154 and 156, respectively. Accordingly, heat shield 160 includes a leading edge 162, a trailing edge 164, and a body 166 extending therebetween. Heat shield body 166 defines a cavity 168 between support 90 and heat shield 160. Heat shield leading edge 162 is radially outward from and adjacent outer band upstream side hook mount 152, and heat shield trailing edge 164 is radially outward from and adjacent outer band downstream side 156.

Heat shield 160 also includes a first set of openings 170 and a second set of openings 172. In one embodiment, heat shield first set of openings 170 includes one first opening 170, and heat shield second set of openings 172 includes a second opening 172. Heat shield second set of openings 172 are in flow communication with turbine vane segment airfoil bodies 94, and heat shield first set of openings 170 are in flow communication with turbine vane segment outer band 150.

More specifically, heat shield second set of openings 172 discharge cooling fluid radially inward into airfoil body cavity first cooling passage 122, and heat shield first set of openings 170 discharge cooling fluid axially towards outer band cooling opening 158. Opening 158 is in flow communication with heat shield openings 170 and with airfoil cavity discharge 116. In one embodiment, heat shield opening 170 is a slot.

During operation, combustion gases discharged from combustor 16 (shown in FIG. 1) to impart rotational energy to rotor assembly 40. As rotor assembly 40 rotates, continued exposure to the hot combustion gases may cause tips of rotor blades 56 to operate at a higher temperature, and over time may cause rupture, oxidation, and fatigue damage to rotor blades 56. To facilitate cooling the rotor blade tips, cooling fluid is supplied to stator assembly support 90. More specifically, cooling fluid is supplied to support cavity 168 between support 90 and heat shield 160.

A portion of cooling fluid is then discharged radially inward through heat shield openings 172 into turbine vane segment airfoil body cavity first cooling passage 122. The remaining cooling fluid, known as bypass cooling fluid, is discharged axially outward through heat shield openings 170 towards turbine vane segment outer band 150.

Cooling fluid entering airfoil body cavity 112 from first cooling passage 122 flows into cavity second cooling passage 124 through cooling openings 130 and metering opening 140. The spent cooling fluid is then discharged from airfoil body cavity 112 through cavity outlet 116 where the spent cooling fluid is then mixed with the bypass cooling fluid discharged axially outwardly through heat shield opening 170 and through outer band metering section 174. In one embodiment, because the spent cooling fluid is routed from upstream where it was used to cool nozzle airfoils, thermodynamic efficiency is facilitated to be increased accordingly. More specifically, within turbine vane segment outer band cooling opening 158, the spent cooling fluid exiting cavity discharge 116 is mixed with the cooling fluid exiting heat shield opening 170 and metered through section 174.

The cooling fluid mixture is then discharged downstream from turbine vane segment outer band 150 into a shroud cavity 180 and then into a rotor assembly support cavity 182. The cooling fluid mixture entering cavity 182 is entrained in the combustion gasflow path and a temperature of the gasflow is accordingly reduced. More specifically, the cooling fluid mixture flows circumferentially around rotating rotor blades 56, rotor tip shroud 80, and rotor seal teeth 86 before being discharged into the combustion gas flowpath. As a result of the cooling fluid flowing through cavity 182, an operating temperature of stator shroud 88 is also facilitated to be reduced. In one embodiment, the cooling fluid mixture diverges and separates, and a portion of the cooling fluid mixture flows radially inwardly to facilitate lowering an operating temperature of at least a portion of rotor blade airfoils 64.

As a result, the cooling fluid facilitates reducing an operating temperature of rotor blade rotor seal teeth 86, rotor blades 56, rotor tip shroud 80, stator shroud 88, and a portion of rotor blade airfoils 64. Additionally, stator assembly 42 is cost-effective because cooling fluid is discharged into a general vicinity of rotor blade rotor seal teeth 86, rotor blades 56, and rotor tip shroud 80, rather than supplied directly to cooling channels defined within rotor blades 56.

Turbine vane segments 92 are fabricated using known manufacturing processes. In one embodiment, each segment 92 is cast using a core (not shown) which creates cavity 112, partition 120, and cooling passages 122 and 124. Openings 130 and 140 are then machined into partition 120. Additional openings 170 and 172 are machined into heat shield 160.

The above-described stator assembly is cost-effective and highly reliable. The stator assembly includes a turbine nozzle assembly that includes an outer band including at least one opening for channeling cooling fluid downstream, and a heat shield that includes a plurality of first openings and a plurality of second openings. The first openings are in flow communication with the outer band opening, and the second openings are in flow communication with the cavity defined within each vane segment. During operation, a portion of cooling fluid is channeled through the vane segment cavity and then mixed with cooling fluid being exhausted through the outer band opening. The cooling fluid discharged from the outer band flows circumferentially around the rotor assembly to facilitate reducing operating temperatures of the rotor blade seal teeth.

While the invention has been described in terms of various specific embodiments, those skilled in the art will recognize that the invention can be practiced with modification within the spirit and scope of the claims.

What is claimed is:

1. A method for operating a gas turbine engine, the engine including a turbine including a plurality of turbine blades and a turbine nozzle assembly, the turbine nozzle assembly including a circumferential row of turbine vane segments and an inner platform, each vane segment extending radially outward from the inner platform and including a tip, a root, and a body extending therebetween, the vane segment tip including an outer band that couples the turbine nozzle assembly within the gas turbine engine, said method comprising the steps of:

channeling combustion gases through the turbine nozzle assembly towards the plurality of turbine blades;

supplying cooling fluid to the turbine vane segment outer band; and exhausting cooling fluid downstream from the turbine vane segment outer band through an opening in the outer band that is configured to control an amount of airflow discharged from the turbine vane segment outer band.

2. A method in accordance with claim 1 wherein the turbine nozzle assembly further includes a heat shield mounted within each turbine vane segment outer band, said step of exhausting cooling fluid downstream further comprises the step of channeling cooling fluid through a first set of openings in each heat shield towards the turbine vane segment outer band.

3. A method in accordance with claim 2 wherein each turbine vane segment body defines a cavity, said method further comprising the step of channeling cooling fluid to each turbine vane segment body cavity.

4. A method in accordance with claim 3 wherein said step of exhausting cooling fluid further comprises the step of channeling cooling fluid through a second set of openings in each heat shield into each turbine vane segment body cavity.

5. A method in accordance with claim 4 wherein said step of exhausting cooling fluid downstream from the turbine vane segment further comprises the step of channeling compressor bleed air into each turbine vane segment.

6. A turbine nozzle assembly for a gas turbine engine, said turbine nozzle assembly comprising a row of turbine vane segments extending radially outward from an inner platform, each said turbine vane segment comprising a tip, a root, and a body extending therebetween, said tip comprising an outer band extending radially outward from said turbine vane segment body, said outer band comprising a plurality of openings configured to channel cooling flow downstream from each said turbine vane segment tip, said plurality of openings further configured to control an amount of cooling flow discharged downstream from said turbine vane segment outer band.

7. A turbine nozzle assembly in accordance with claim 6 further comprising a heat shield mounted within each said turbine nozzle assembly outer band.

8. A turbine nozzle assembly in accordance with claim 7 wherein said heat shield comprises a plurality of first openings and a plurality of second openings, at least one of said first openings and said second openings in flow communication with said turbine vane segment outer band.

9. A turbine nozzle assembly in accordance with claim 8 wherein said turbine vane segment body defines a cavity, said heat shield second openings in flow communication with said turbine vane segment body cavity.

10. A turbine nozzle assembly in accordance with claim 8 wherein said heat shield first openings in flow communication with said turbine vane segment outer band.

11. A turbine nozzle assembly in accordance with claim 6 wherein said cooling flow channeled flow downstream through said turbine vane segment outer band opening is compressor bleed air.

12. A gas turbine engine comprising a low pressure turbine comprising a plurality of turbine blades and a turbine nozzle assembly for channeling airflow to said turbine blades, said turbine nozzle assembly comprising a circumferential row of turbine vane segments and an inner platform, each said vane segment extending radially outward from said inner platform and comprising a tip, a root, and a body extending therebetween, said tip comprising an outer band configured to couple said turbine nozzle assembly within said gas turbine engine, said outer band comprising at least one opening configured to channel cooling airflow downstream from each said vane segment tip, said at least one opening further configured to regulate an amount of airflow discharged from said vane segment outer band.

13. A gas turbine engine in accordance with claim 12 wherein said turbine nozzle assembly further comprises a heat shield mounted within each said turbine vane segment outer band.

14. A gas turbine engine in accordance with claim 13 wherein said turbine nozzle assembly heat shield comprises a plurality of first openings and a plurality of second openings, said heat shield first openings configured to discharge cooling air downstream towards said turbine vane segment outer band.

15. A gas turbine engine in accordance with claim 14 wherein said turbine nozzle assembly heat shield second openings configured to discharge cooling air towards said turbine vane segment body.

16. A gas turbine engine in accordance with claim 14 wherein each said turbine vane segment comprises a cavity, said turbine nozzle assembly heat shield second openings in flow communication with said turbine vane segment cavity.

17. A gas turbine engine in accordance with claim 14 wherein said turbine nozzle assembly turbine vane segment body comprises a cavity, at least one of said turbine nozzle assembly heat shield first and second openings in flow communication with said turbine nozzle assembly turbine vane segment cavity.

18. A gas turbine engine in accordance with claim 14 wherein said cooling air discharged through said turbine nozzle assembly heat shield is compressor bleed air.

* * * * *